United States Patent

Cosyns

Patent Number: 6,046,679
Date of Patent: Apr. 4, 2000

[54] METHOD AND INDICATOR LIGHT FOR INDICATING THE WIND DIRECTION AND WIND VELOCITY AND THE AIR POLLUTION LEVEL

[76] Inventor: Jean-Pierre Cosyns, 13, Allée des Eiders, F-75019-Paris, France

[21] Appl. No.: 08/993,227

[22] Filed: Dec. 18, 1997

Related U.S. Application Data

[63] Continuation of application No. PCT/FR96/01020, Jul. 2, 1996, abandoned.

[30] Foreign Application Priority Data

Jul. 3, 1995 [FR] France ................................. 9507980

[51] Int. Cl.[7] ..................................................... G08B 5/00
[52] U.S. Cl. ................................. 340/815.4; 340/815.56; 340/815.66; 340/815.67; 340/955; 340/949; 340/601; 340/671; 340/691; 73/170.06; 73/170.09; 73/170.16; 116/202
[58] Field of Search ........................... 340/815.4, 815.65, 340/815.55, 815.56, 815.66, 815.67, 815.73, 954, 955, 949, 601, 672, 670, 671, 691, 815.42, 815.43; 73/170.06, 170.07, 170.08, 170.09, 170.16; 116/202, 265, 274, 284

[56] References Cited

U.S. PATENT DOCUMENTS

| | | | |
|---|---|---|---|
| 3,665,759 | 5/1972 | Daley | 73/188 |
| 3,780,566 | 12/1973 | Smith et al. | 12/73 |
| 4,031,754 | 6/1977 | Bedard | 73/188 |
| 4,201,973 | 5/1980 | Jackson et al. | 340/949 |
| 4,454,757 | 6/1984 | Weinstein et al. | 73/189 |
| 4,790,255 | 12/1988 | Shively et al. | 114/97 |
| 5,469,738 | 11/1995 | Hendrickson | 73/170.07 |

*Primary Examiner*—Julie Lieu
*Attorney, Agent, or Firm*—Rines and Rines

[57] ABSTRACT

The indicator light is constituted by a panel supporting juxtaposed and alternating neon tubes of blue, yellow, green and red color, these colors being assigned to the cardinal points north, east, south and west respectively. These tubes have voltage applied by means of a selector controlled by a weather vane, activating permanently the neon tubes of the color corresponding to the position of the weather vane. A series of colored lamps, displaying the Beaufort scale, indicates the wind velocity by means of a selector controlled by the anemometer. Colored light sources indicate the air pollution level.

9 Claims, 2 Drawing Sheets

METHOD AND INDICATOR LIGHT FOR INDICATING THE WIND DIRECTION AND WIND VELOCITY AND THE AIR POLLUTION LEVEL

This is a continuation of international application PCT/FR96/01020, filed Jul. 2, 1996 which designated the United States and is now abandoned.

TECHNICAL FIELD

The invention relates to indicator lights for indicating the wind direction and wind velocity and the air pollution level.

BACKGROUND OF THE INVENTION

It is known, from French Patent 2,172,485, to convert the angular displacements of a weather vane into a variation in intensity of an electric current so as to be able to display at a distance, with the aid of an ammeter, the wind direction. Such installations are used in meteorology and in particular in airfield control towers.

It is also known, from French Patent 2,170,964, to arrange in a circle pilot lamps for displaying the position of a speed and direction anemometer and the wind force. To do this, magnetic cams are mounted on the spindle of the weather vane and these control contactors for application of voltage to the pilot lamps; the illumination of the lamps can be modulated according to the wind velocity.

A light column is also known, from the PCT Patent application WO 94 14150, the external wall of which is intended to serve as a display carrier and comprises, at its top, a solar sensor which orientates itself according to the position of the sun.

The document DE-C-901,634 discloses a device in which the compass dial is divided into sectors having each a determined color and corresponding to the wind direction. The speed of the wind is also displaid.

The document EP-A-0,365,047 discloses a device showing the air pollution level.

However, none of these devices makes it possible to give, at a distance and in darkness, a simple and direct indication, which is nevertheless adequate for the most usual requirements, of the wind direction and wind velocity and of the air pollution level, without any aesthetically detrimental effect.

SUMMARY OF THE INVENTION

The aim of the present invention is to eliminate these disadvantages. This invention, as disclosed herein, solves the problem of defining a method and of producing a device which make it possible to convert the mechanical indications of wind direction and wind velocity into light indications which are differentiated according to the sectors of the compass dial and selected according to the wind velocity and indications of air pollution level sensors.

The method of using light to indicate at a distance the wind direction and wind velocity, and also the air pollution level, according to the invention, which makes use of a weather vane and an anemometer, mainly consists in:

a) dividing the compass dial into four equal sectors each corresponding to an angle of 90°, the bisecting lines of which coincide respectively with the directions north, east, south and west, that is to say the sectors cover respectively, in the clockwise direction, the sectors north west to north east, north east to south east, south east to south west and south west to north west;

b) assigning to each sector delimited in the preceding step a) a predetermined color, chosen arbitrarily to form a color code;

c) choosing light sources colored according to the color code defined in the preceding step b) in an equal number for each color;

d) juxtaposing the colored light sources brought together in the preceding step c), alternating them regularly and respecting the order defined in step a);

e) individually connecting each colored light source to an electricity supply of appropriate specification, interposing a selector controlled by the angular displacement of the weather vane in such a manner that only the light sources of the same color corresponding to the sectors defined in step d) are illuminated when the weather vane is orientated according to one of the cardinal points due north, due east, due south or due west, but are illuminated over only a part of the distance covered by all the juxtaposed colored light sources, when the weather vane forms an angle with the direction of the cardinal point in question; the light indication of the wind direction then being specified by the illumination of the remaining part of the distance covered by the light sources of the color corresponding to that assigned to the sector in the direction of which the weather vane is angularly offset in relation to the cardinal point in question, the remaining part then being proportional to the value of the angle swept by the weather vane, and in such a manner that, in the case of a wind blowing from the north east quarter, for example, both part and remaining part illuminated are equal and the light is emitted respectively in the color assigned to each of the cardinal points in question, f) associating with the colored light sources which serve to indicate the wind direction, as defined above, a series of light sources of a color chosen arbitrarily and distributed according to the Beaufort scale ; each light source corresponds to one degree of the Beaufort scale or of an equivalent wind speed scale;

g) individually connecting the light sources intended to indicate the wind force, as defined in step f) above, to an electricity supply of appropriate specification, interposing a selector controlled by the speed of rotation of the anemometer, effecting the illumination of only those light sources corresponding to the graduations of the Beaufort scale which are covered by the wind force, in such a manner that, in the case of a force four wind for example, only the first four light sources of the series are illuminated; and h) utilizing colored light sources which are actuated separately according to the air pollution level measured by dedicated sensors, assigning a separate color to each predetermined pollution level.

Preferably, the color code chosen to indicate the wind direction would be: blue, yellow, green and red. These could correspond to the cardinal points as follows: north=blue, east=yellow, south=green, west=red.

The colors corresponding to each predetermined pollution level are, in increasing level order, green, orange and red.

The indicator light indicating the wind direction and wind velocity, which makes it possible to implement the method according to the invention, is characterized mainly in that the colored indicator lights are constituted by luminescent tubes of four different colors, each corresponding to a particular sector of the compass dial, which tubes are juxtaposed and alternated regularly so as to cover a surface area which is adequate for interpretation of the wind direction at a distance, and the dimension measured in a plane perpendicular to these tubes corresponds to the distance determined in step e) of the method, in that the individual or collective application of voltage to the colored luminescent tubes indicating the wind direction is achieved by means of a selector controlled by the angular displacement of the weather vane, and in that the individual application of voltage to the light sources representing the degrees of the Beaufort scale is achieved by means of a selector controlled by the anemometer.

According to one particular embodiment of the indicator, the luminescent tubes are neon tubes.

More specifically, the luminescent tubes are circular and are fixed around a mast supporting a speed and direction anemometer, behind a translucent wall.

According to an embodiment of the invention, the colored luminescent tubes indicating the wind direction and the light sources representing, on the one hand, the degrees of the scale and, on the other hand, the air pollution level are fixed on a panel arranged against the facade of a building, on the top of which the speed and direction anemometer, or a separate weather vane and anemometer, is/are arranged.

According to an electromechanical embodiment, the selector, which effects the individual and/or collective application of voltage to the colored luminescent tubes, is constituted by an insulating ring, on the perimeter of which are fixed, with regular spacing, conductor studs, the number of which corresponds to the total number of said colored luminescent tubes and to each of which one of the terminals for application of voltage to the tubes is connected, those having the same color being grouped together in the same sector, respecting their order on the indicator and the color code defined in steps a) to d) of the method. Resting on these studs is a conductor shoe controlled by the displacement of the weather vane, said shoe, which covers an angle of 90°, being arranged symmetrically in relation to the longitudinal plane of symmetry of the weather vane and being connected to one of the terminals of the electricity supply intake while the other terminal is connected directly and collectively to the second terminal for application of voltage to the tubes. By these means, therefore, all the tubes of the same color, and only these, have voltage applied when the weather vane is orientated in the direction of one of the cardinal points, and the entire height of the indicator is illuminated in the same color, whereas tubes of one of the neighboring colors gradually have voltage applied in replacement of those which are gradually deactivated when the shoe slides towards the cardinal point towards which the weather vane orientates itself as soon as a shift in relation to the cardinal point in question appears.

According to a particular embodiment, the end of the tail of the weather vane comprises a light source displaying the axis X—X of the weather vane and making it possible to locate, in conjunction with the colored indications of the wind direction, the geographical situation of a point in relation to the weather vane.

Additionally, the tail of the weather vane is provided with three light sources, of green, orange and red color respectively, which are actuated separately according to the pollution level measured by dedicated sensors, according to a predetermined code which makes the colors green, orange and red correspond respectively to air quality levels of good, medium and poor.

According to an embodiment, the light sources are constituted by light spheres of a blue color which are embedded in the tail of the weather vane and encircled, on both sides of the tail, by a circular neon tube of appropriate color.

The advantages afforded by the present invention consist essentially in that the approximate indications of the wind direction and wind velocity, as well as of the air pollution level, which are adequate for usual requirements, are thus made permanently available to the public, both day and night, be relying on simple, and consequently very reliable, means.

BRIEF DESCRIPTION OF THE DRAWINGS

Other characteristics and advantages will emerge from the description which follows of a flat embodiment and of a circular embodiment of the invention, given by way of non-limiting example with reference to the attached drawings, in which.

DETAILED DESCRIPTION OF A BEST EMBODIMENT OF THE INVENTION

Figure 1:
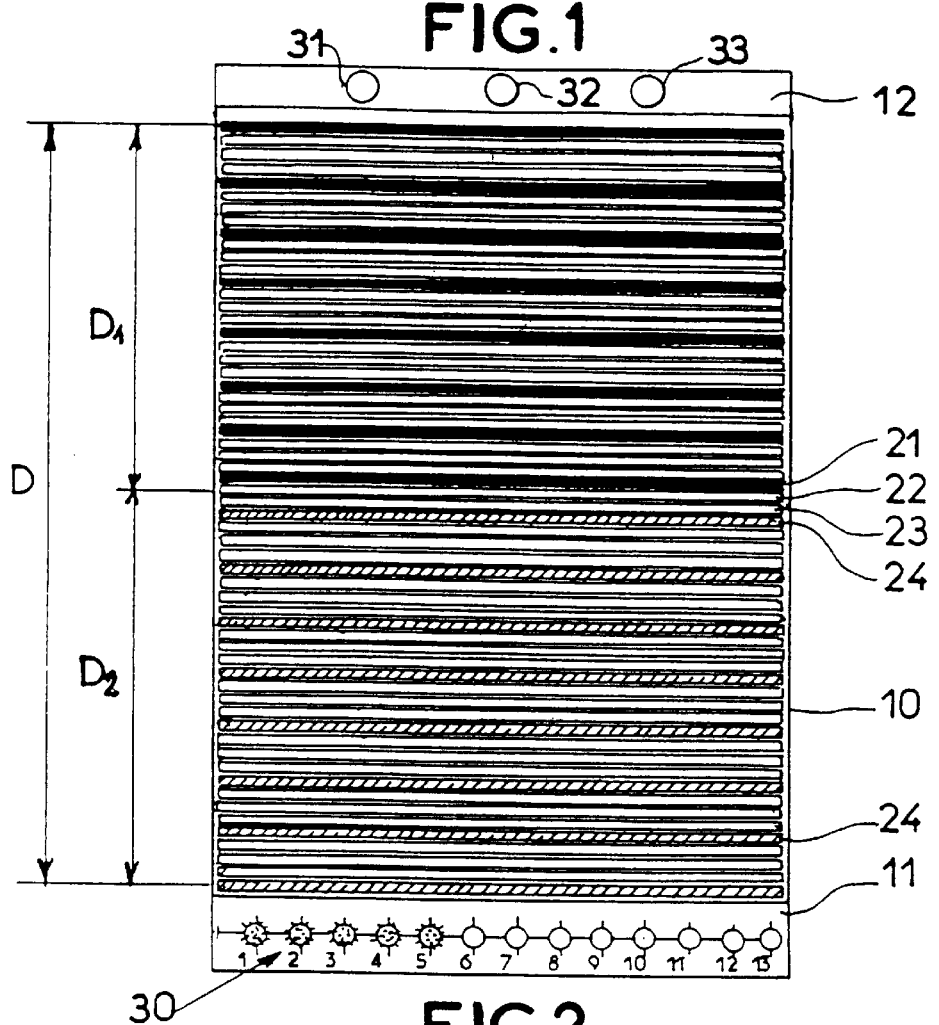
FIG. 1 shows a panel covered with rectilinear neon tubes produced in four colors and with two rows of lamps which are separated by the neon tubes.

FIG. 1 shows an indicator light for indicating the wind direction and wind velocity, which is constituted by a panel 10 supporting juxtaposed and alternating neon tubes of blue, red, yellow and green color, some of the tubes of blue color 21 and of red color 24 being illuminated, while the tubes of yellow color 22 and green color 23 remain unilluminated.

A first series of colored lamps 30 is arranged in the lower part 11 of the panel 10, the first five lamps of the series being illuminated to indicate that the wind velocity corresponds to degree 5 of the Beaufort scale. A second series of three light sources 31, 32, 33, colored respectively green, orange and red and each corresponding to a pollution level 1, 2 or 3, is arranged in the upper part 12 of the panel 10.

Figure 2:
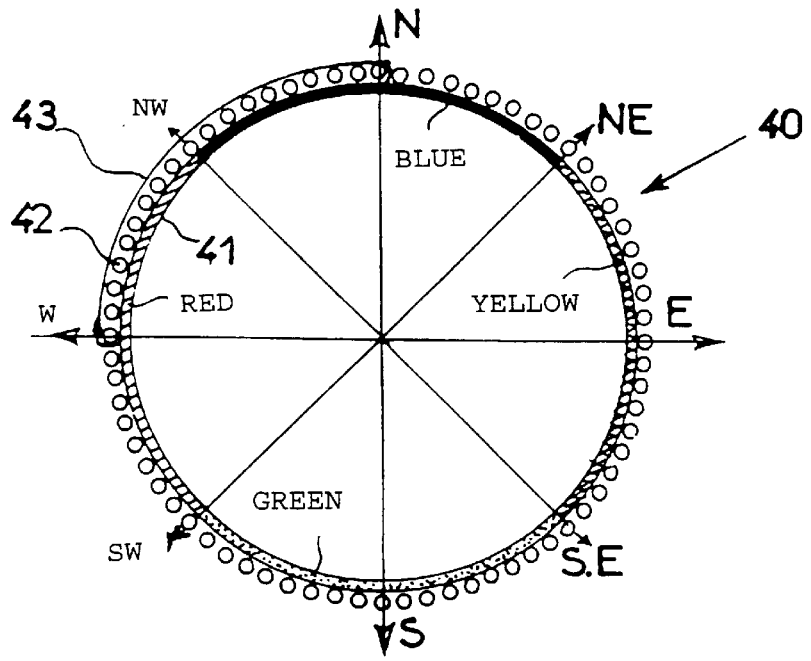
FIG. 2 shows a diagram of the selector for the colored luminescent tubes, with the colors distributed according to the sectors of the compass dial.

FIG. 2 is a diagrammatic representation of the selector 40 for the colored neon tubes 21, 22, 23, 24 shown in FIG. 1. The shoe 43 interconnecting the studs 42 surrounding the insulating ring 41 driven by the weather vane (not shown in this Figure) is in the north west position (NW), which means that, in this position of the shoe 43, only half the tubes of red color have voltage applied and consequently are illuminated. The result is that, with the aid of a translucent plate covering all the neon tubes, two zones colored respectively blue and red are superposed to give, by virtue of the color code, a visual indication of the direction from which the wind is blowing.

It will be understood that, when the wind blows from the north north west sector, three quarters of the tubes of blue color are illuminated while only one quarter of the tubes of red color are illuminated.

Figure 3:
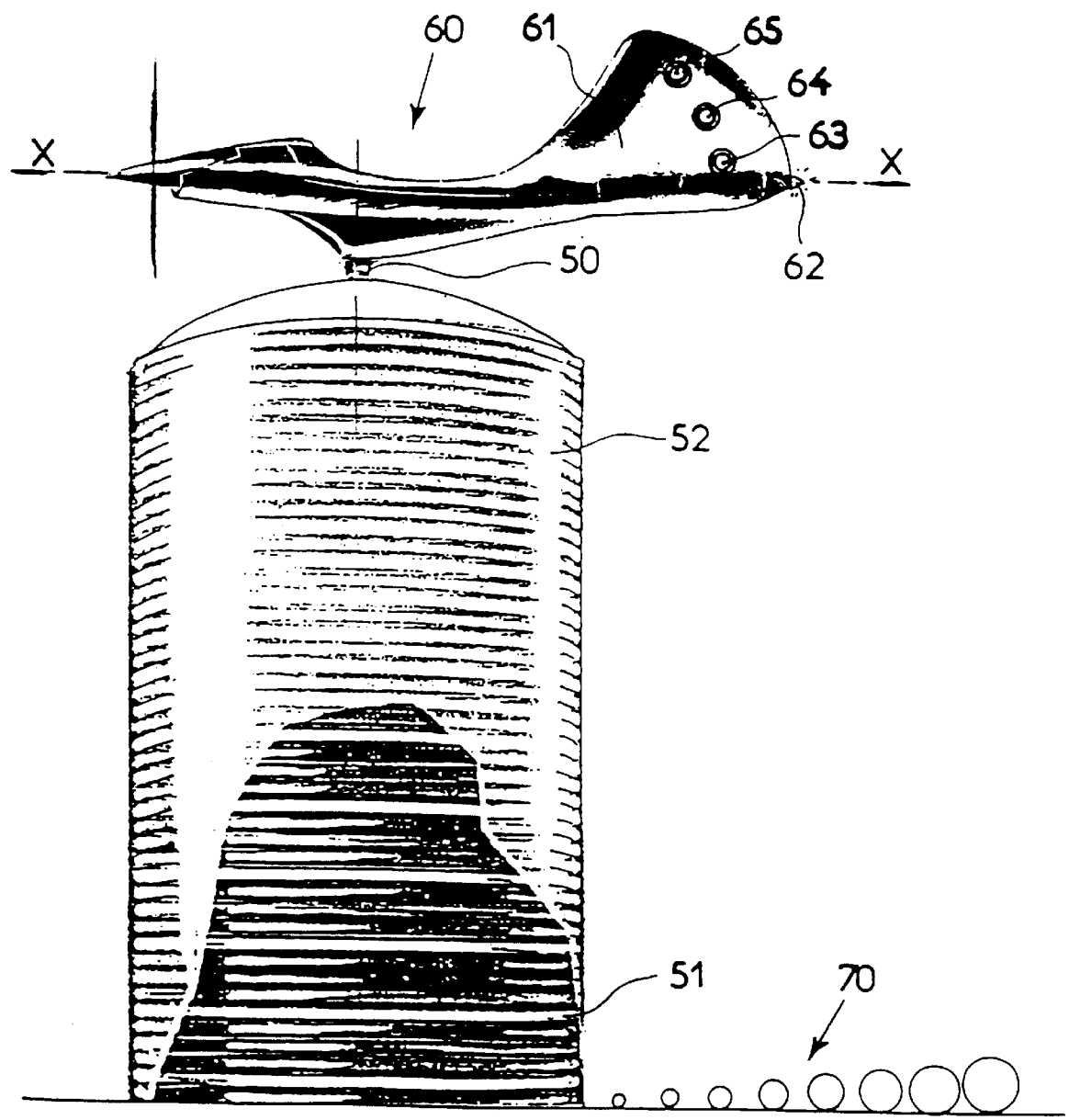
FIG. 3 shows a cylindrical mast supporting a speed and direction anemometer and surrounded by superposed neon tubes which are situated behind a translucent protective wall, at the foot of which a series of lamps indicating the wind velocity is arranged.

Referring now to FIG. 3, which shows a vertical mast 50 which is surrounded by colored neon tubes 51 arranged behind a translucent cylindrical wall 52 and is surmounted by a speed and direction anemometer 60, it can be seen that, according to the orientation of the weather vane 60 and the wind velocity, the translucent cylindrical wall is colored with two different colors, respectively covering a height proportional to the position of the weather vane in relation to the closest cardinal points to which the colors correspond. As for the light sources 70 aligned on the ground, these too are illuminated, one after another, until they correspond to the graduation of the Beaufort scale corresponding to the wind velocity, by virtue of a selector controlled by the speed of rotation of the anemometer.

Whatever the embodiment, the translucent wall interposed between the neon tubes and the eye of the users allows the latter an impression of continuity of the surfaces which are colored by means of the illuminated colored tubes in spite of the spacing of these.

Referring again to FIG. 3, it can be seen that the end of the tail 61 of the speed and direction anemometer 60 is equipped with a colored light source 62 embodying the longitudinal axis X—X of the weather vane, which thus makes it possible to know, both day and night, a relative geographical position, in conjunction with the colored indications of the wind direction provided by the indicator. It will also be observed in this same figure that the tail 61 is provided with superposed light spheres 63, 64 and 65 encircled by circular neon tubes of given color, which each correspond to an air pollution level.

The indicator light according to the invention may have any form and any appearance with a view to making possible in particular its light-related integration into architectural developments, into urban sites, or into urban furniture, the structure of the system not being limited to a panel or a-light column. It is to be emphasized that the simplified embodiment as shown in FIG. 1 is perfectly suited to mounting in the facade of a building or on a highway indicator panel in the same way as devices which currently give the time and the ambient temperature, or even in conjunction with these.

In the event that the light system were to be placed in open country, or in a place not provided with an electric power network, wind energy or a photo-voltaic energy source could be used.

While there have been shown and described what are at present considered to be the preferred embodiments of the invention, it will be apparent to those skilled in the art that various changes and modifications can be made herein without departing from the scope of the invention as defined by the appended claims.

For instance, the Beaufort scale may be substitued by a meter-per-second scale or by an equivalent wind scale. Identically, neon tubes may be substituted by any kind of light sources, e.g. the light sources generally used for public display panel in stadiums, musical concerts or equivalent.

What is claimed is:

1. Method of using light to indicate at a distance the wind direction and wind velocity and the air pollution level, which makes use of a weather vane, an anemometer and sensors, consisting in the following steps:

a) dividing the compass dial into four equal sectors each corresponding to an angle of 90°, bisecting lines of which coincide respectively with the cardinal points, respectively, in the clockwise direction, the sectors north west to north east, north east to south east, south east to south west and south west to north west, b) assigning to each sector delimited in the preceding step a) a predetermined color, chosen arbitrarily to form a color code, c) choosing light sources colored according to the color code defined in the preceding step b) in an equal number for each color, d) juxtaposing the colored light sources brought together in the preceding step c), alternating them regularly and respecting the order defined in step a), e) individually connecting each colored light source to an electricity supply of appropriate specification, interposing a selector controlled by the angular displacement of the weather vane in such a manner that only the light sources of the same color corresponding to the sectors defined in step d) are illuminated when the weather vane is orientated in the direction of one of the cardinal points, but are illuminated over only a part of the distance covered by all the juxtaposed colored light sources, when the weather vane forms an angle with the direction of the cardinal point in question, the light indication of the wind direction then being specified by the illumination of the remainder of said distance covered by the light sources of the color corresponding to that assigned to the sector in the direction of which the weather vane is angularly offset in relation to the cardinal point in question, said remainder then being proportional to the value of the angle swept by the weather vane, f) associating with the colored light sources which serve to indicate the wind direction, a series of light sources distributed according to the wind speed, in such a manner that each light source corresponds to one graduation of the wind speed scale, g) individually connecting the light sources intended to indicate the wind force, as defined in step f) above, to an electricity supply of appropriate specification, interposing a selector controlled by the speed of rotation of the anemometer, effecting the illumination of only those light sources corresponding to the graduations of the wind speed scale, and h) utilizing further colored light sources which are actuated separately according to the pollution level measured by dedicated sensors, assigning a separate color to each pollution level.

2. Method according to claim 1, wherein the color code which makes it possible to display the wind direction is as follows: north=blue; east=yellow; south=green; west=red.

3. Method according to claim 1, wherein the colors corresponding to each pollution level are, in increasing level order, green, orange and red.

4. Indicator light indicating the wind direction and wind velocity and the air pollution, which makes use of a weather vane, an anemometer and sensors, comprising sets of colored indicator lights, wherein said colored indicator lights indicating the wind direction are constituted by light sources of four different colors, each corresponding to a particular sector of the compass dial, which sources are juxtaposed and alternated regularly so as to cover a surface area which is adequate for interpretation of the wind direction at a distance;

wherein the individual and collective application of voltage to the colored light sources indicating the wind direction is achieved by means of a selector controlled by the angular displacement of a weather vane, wherein the individual and collective application of voltage to the light sources representing the graduations of the used wind speed scale is achieved by means of a selector controlled by the anemometer, and wherein the colored light sources utilized to indicate the air pollution level are constituted by further light sources of a blue color encircled by a plurality of light sources of green, orange or red color.

5. Indicator light according to claim 4, wherein the light sources consist of luminescent tubes arranged behind a translucent wall.

6. Indicator light according to claim 4, wherein the selector, which effects the selective application of voltage to the light sources is constituted by an insulating ring, on the perimeter of which are fixed, with regular spacing, conductor studs, the number of which corresponds to the total number of the light sources and to each of which one of the terminals of the light sources is connected, those having the same color being grouped together in the same sector, respecting their order on the indicator and the color code, resting on which studs is a conductor shoe controlled by the displacement of the weather vane and covering an angle of 90°, which shoe is arranged symmetrically in relation to the plane of symmetry of the weather vane and forward of the latter and is connected to one of the terminals of the electricity supply while the other terminal is connected directly and collectively to the second terminal for application of voltage to the light sources.

7. Indicator light according to claim 4, wherein the colored light sources consist of circular neon tubes and are fixed around a mast behind a translucent cylindrical wall, said mast supporting a speed and direction anemometer, and the light sources indicating the wind velocity are aligned radially, at the base of the unit.

8. Indicator according to claim 4, wherein the end of the tail of the weather vane comprises a light source displaying the axis X—X of said weather vane and makes it possible to locate, in conjunction with the colored indications of the wind direction, the geographical situation of a point in relation to the weather vane.

9. Indicator light according to claim 4, wherein the light sources consist of bulbs indicating the pollution level, bulbs which are embedded in the tail of the weather vane and encircled on both sides of the latter by a circular neon tube, of appropriate diameter and color, corresponding to a given pollution level.

* * * * *